W. H. BUNCH.
Rotary Churns.
No. 141,692.
Patented August 12, 1873.
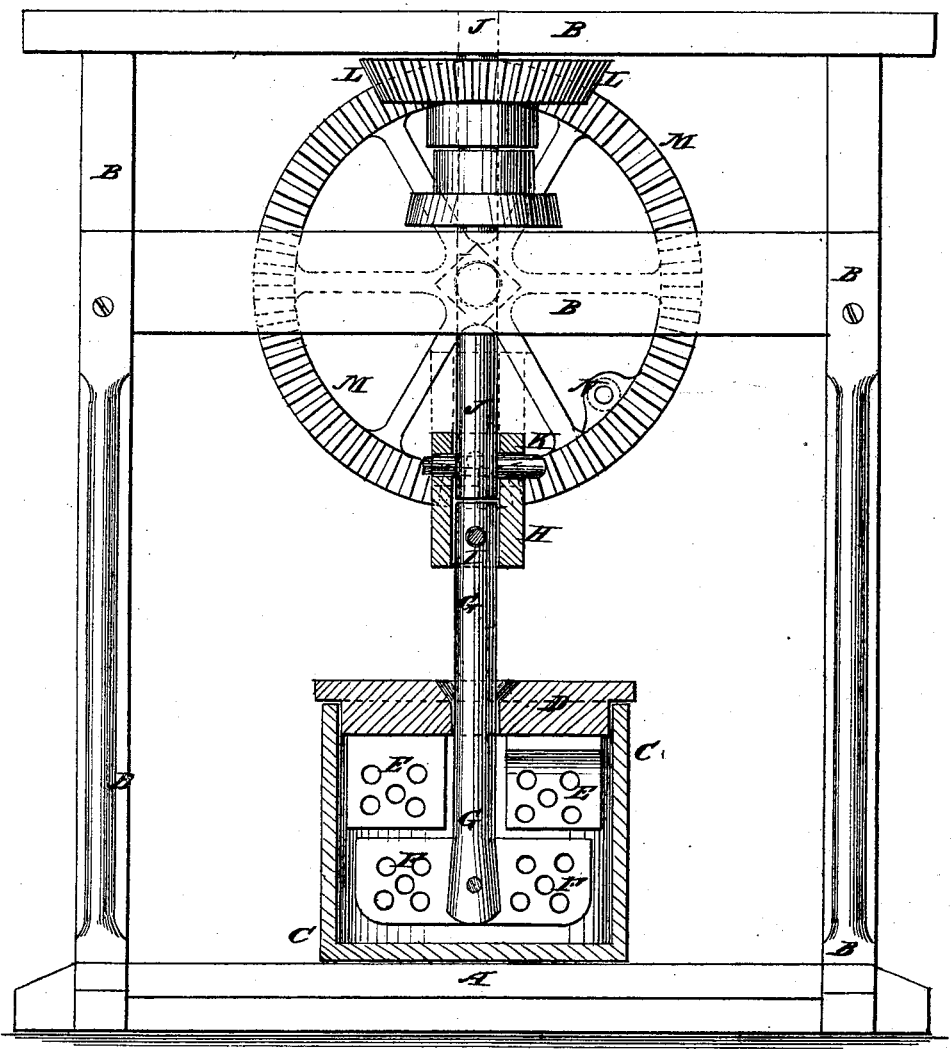
Witnesses:
P. C. Dittrich
C. Sedgwick
Inventor:
W. H. Bunch
Per
Attorneys.

UNITED STATES PATENT OFFICE.

WILLIAM H. BUNCH, OF WINDSOR, NORTH CAROLINA.

IMPROVEMENT IN ROTARY CHURNS.

Specification forming part of Letters Patent No. 141,692, dated August 12, 1873; application filed May 24, 1873.

*To all whom it may concern:*

Be it known that I, WILLIAM H. BUNCH, of Windsor, in the county of Bertie and State of North Carolina, have invented a new and useful Improvement in Churns, of which the following is a specification:

The figure is a vertical section of my improved churn.

My invention has for its object to furnish an improved churn simple in construction, convenient in use, and effective in operation, bringing the butter very quickly. My invention is an improvement in the class of rotary churns having perforated removable wings or dashers attached to the sides. The improvement consists in providing the cover of a churn with vertically-pendent, perforated, and curved or beveled wings, which co-operate with a dasher arranged to rotate below them, as hereinafter described.

A is the platform upon which the churn stands, and B is the frame-work that supports the gearing. C is the churn-body, which may be an ordinary churn-body or the crock or other vessel in which the milk has stood. The body C is provided with a closely-fitting cover, D, to the lower side of which, upon the opposite sides of its center, are attached two wings or stationary dashers, E. The wings E are made curved upon the side, against which the milk dashes, and vertical upon the other side. The wings E are perforated with numerous holes. F is the revolving wing or dasher, which is made of such a size as to work freely in the lower part of the churn-body A, has numerous holes formed through it, and is attached, at its middle part, to the lower end of the vertical shaft G, which passes up between the inner edges of the stationary wings E and through a hole in the center of the cover D. Upon the upper end of the shaft G is fitted the lower end of a sleeve, H, which is secured to said shaft so as to carry it with it in its revolution by a wooden pin, I, which passes through said sleeve and shaft. In the upper part of the sleeve H is fitted the lower end of the shaft J, which is secured to said sleeve by a wooden pin, K, which passes through the said sleeve and shaft. The shaft J revolves in bearings in a cross-bar of the frame B, and to its upper part is attached a bevel-gear wheel, L, into the teeth of which mesh the teeth of the bevel-gear wheel M, the journals of which revolve in bearings in the cross-bars of the frame B. To the gear-wheel M is attached a crank, N, by which the churn is operated. The shaft J may be connected with and driven by any suitable gearing and power.

Having thus described my invention, I claim as new and desire to secure by Letters Patent—

The perforated wings or dashers E E curved upon one side and suspended vertically from the removable cover D, in combination with the dasher F arranged to rotate in the space below them, all as and for the purpose specified.

WILLIAM H. BUNCH.

Witnesses:
 A. R. THOMPSON,
 E. L. SIMMONS.